United States Patent [19]
Penners et al.

[11] Patent Number: 5,793,762
[45] Date of Patent: Aug. 11, 1998

[54] SYSTEM AND METHOD FOR PROVIDING PACKET DATA AND VOICE SERVICES TO MOBILE SUBSCRIBERS

[75] Inventors: John Henry Hubert Penners, Boulder; Purushottam Vithal Kamat, Louisville; Dejan Sirovica, Boulder, all of Colo.

[73] Assignee: U S West Technologies, Inc., Boulder, Colo.

[21] Appl. No.: 498,824

[22] Filed: Jul. 6, 1995

Related U.S. Application Data

[63] Continuation-in-part of Ser. No. 226,789, Apr. 12, 1994, Pat. No. 5,457,736.

[51] Int. Cl.$^6$ .......................... H04L 12/28; H04L 12/56
[52] U.S. Cl. .................... 370/389; 370/352; 370/392; 370/458; 379/67; 379/90.01; 379/93.01; 455/461; 455/439
[58] Field of Search .................. 379/58, 59, 60, 379/67, 89, 93.07, 93.08, 93.25, 100.11, 201, 93.01, 90.01; 370/389, 400, 392, 352, 458, 401, 383, 390; 455/33.1, 33.2, 56.1, 439, 461

[56] References Cited

U.S. PATENT DOCUMENTS

| | | |
|---|---|---|
| 4,771,425 | 9/1988 | Baran et al. .................. 370/458 |
| 4,980,907 | 12/1990 | Raith et al. .................. 455/465 |
| 5,175,878 | 12/1992 | Davis et al. .................. 455/103 |
| 5,195,091 | 3/1993 | Farwell et al. .................. 370/336 |
| 5,247,347 | 9/1993 | Litteral et al. .................. 348/7 |
| 5,315,636 | 5/1994 | Patel .................. 455/461 |
| 5,319,699 | 6/1994 | Kerihuel et al. .................. 455/461 |
| 5,329,578 | 7/1994 | Brennan et al. .................. 379/67 |
| 5,353,331 | 10/1994 | Emery et al. .................. 455/461 |
| 5,457,736 | 10/1995 | Cain et al. .................. 455/439 |
| 5,533,019 | 7/1996 | Jayapalan .................. 370/352 |
| 5,544,222 | 8/1996 | Robinson et al. .................. 455/557 |
| 5,590,133 | 12/1996 | Billstrom et al. .................. 370/349 |
| 5,608,786 | 3/1997 | Gordon .................. 370/352 |

OTHER PUBLICATIONS

Yang, C., "RFC 1789: INETPhone—Telephone Services and Servers on Internet." Apr. 1995. <http://ds.internic.net/rfc/rfc1789.txt>(12 Feb. 1997).

Weinstein, C., et al. "Experience with Speech Communication in Packet Networks." IEEE Journal on Selected Areas in Communications, vol. SAC-1, No. 6, Dec. 1983.

Baran, P., "On Distributed Communications Networks." IEEE Transactions on Communications Systems, manuscript received Oct. 1963. Mar. 1964.

System 900: The ISDN Approach to Cellular Mobile Radio, W. Weiss et al.; Electrical Communication, vol. 63, No. 4—1989.

Intelligent Network Concepts in Mobile Communication, B. Jabbari; IN In Cellular Networks.

Cellular Mobile Radio as an Intelligent Network Application, M. Ballard et al.; Electrical Communication, vol. 63, No. 4—1989.

*Primary Examiner*—Wellington Chin
*Assistant Examiner*—Melissa Kay Carman
*Attorney, Agent, or Firm*—Brooks & Kushman

[57] ABSTRACT

A system and method for providing internet data and voice services to mobile subscribers is directed for use in cooperation with Internet Packet Data Network (IPDN) and an Advanced Intelligent Network (AIN) having an existing wireline switch. The system and method obviate the need for a mobile telephone switch and can include at least one mobile terminal having the functionality of a mobile host, at least one Home Location Register (HLR), a data base, a plurality of Radio Port Controllers (RPCs) in communication with at least one Radio Port (RP), an internet access node, a home agent, a Correspondent Host (CH) and a Visitor Location Register/Directory Number Manager (VLR/DN-MGR). The HLR is operative to store and provide subscription data and keep track of where at least one mobile terminal is registered in order to deliver calls thereto. The VLR/DN-MGR, together with the wireline switch, are operative to control the plurality of RPCs and coordinate the transmission of voice and data services.

10 Claims, 6 Drawing Sheets

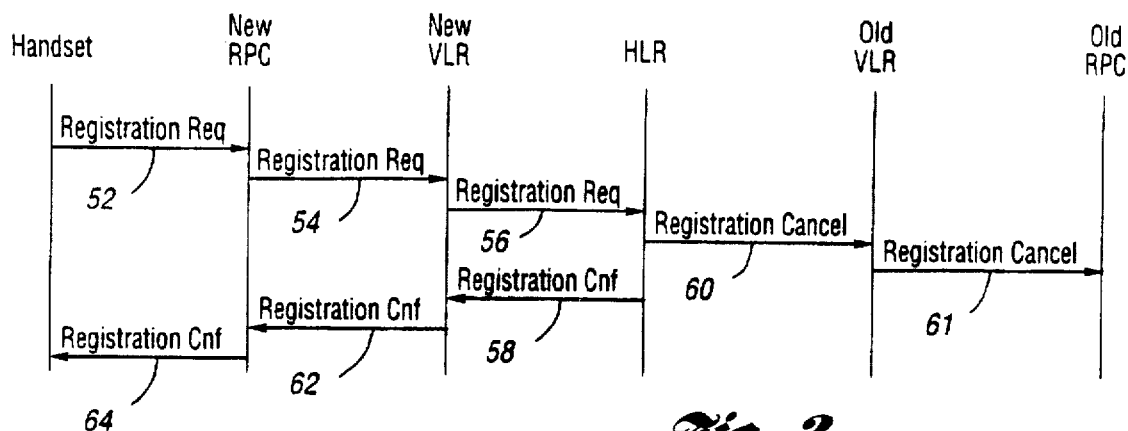
Fig. 3
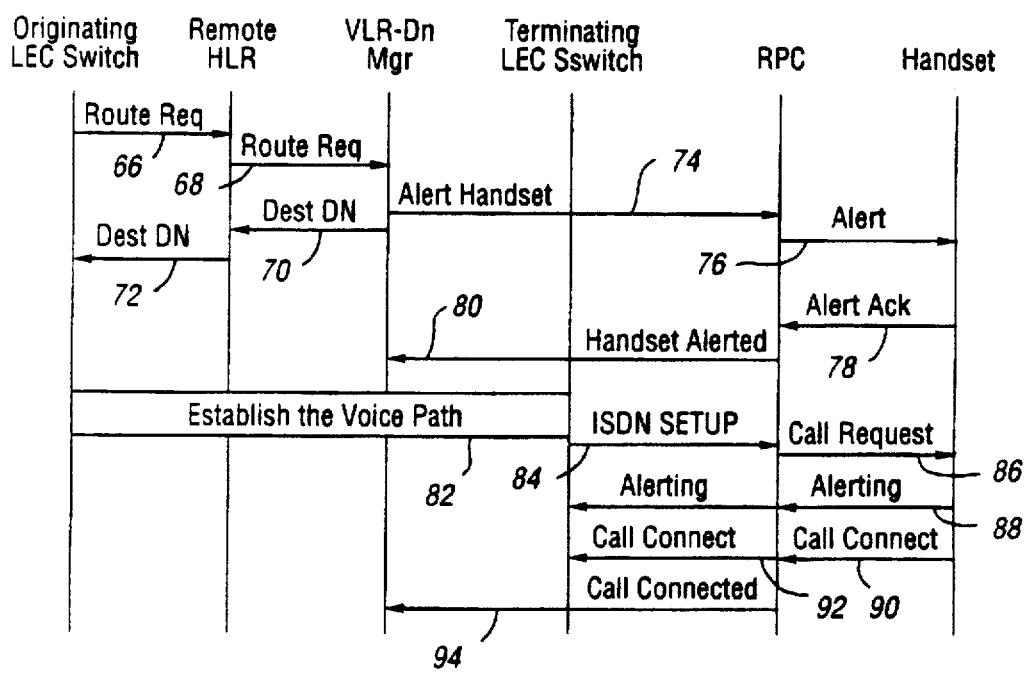
Fig. 4
Fig. 5
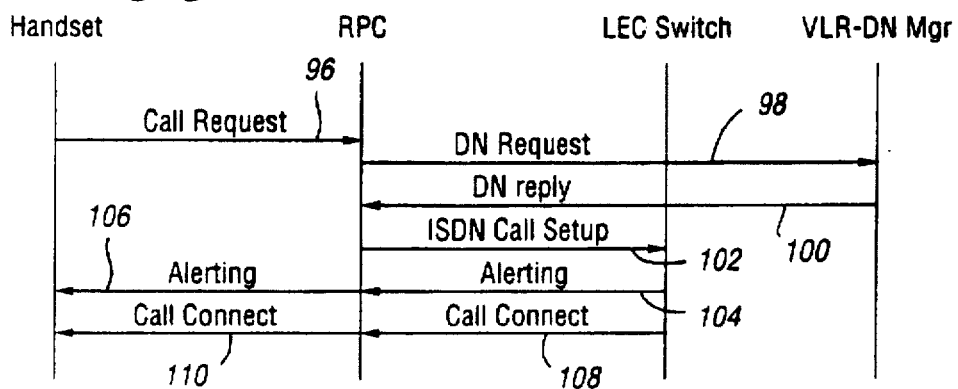

SYSTEM AND METHOD FOR PROVIDING PACKET DATA AND VOICE SERVICES TO MOBILE SUBSCRIBERS

CROSS-REFERENCE TO RELATED APPLICATIONS

This application is a continuation-in-part of U.S. patent application Ser. No. 08/226,789, filed Apr. 12, 1994, now U.S. Pat. No. 5,457,736 which is incorporated herein by reference, and which has at all times relevant hereto been commonly owned.

TECHNICAL FIELD

This invention relates to a system and method for providing internet data and voice services to subscribers at mobile terminals utilizing an existing wireline switch.

BACKGROUND ART

Wireless or "mobile" communications have been found to be of great value to station users who roam large geographic areas yet who desire immediate access to telephone services, especially in critical situations. Presently, the most common form of personal wireless communications are cellular telephones. Cellular telephones are operable in cooperation with known cellular networks which consist of four basic components: a Mobile Telephone Switching Center (MTSC); a cell site containing a controller and radio transceiver; system interconnections; and mobile or portable telephone units, i.e. handsets.

The MTSC is known to those skilled in the art as a digital telephone exchange which controls the switching between the Public Switched Telephone Network (PSTN) and the cell sites for all wireline-to-mobile and mobile-to-wireline calls as well as for mobile-to-mobile calls. The MTSC also processes mobile unit status data received from the cell site controllers, switches calls to other cells, processes diagnostic information, and compiles billing statistics.

In operation, when the MTSC receives a call from the PSTN which is directed to a mobile telephone user, the MTSC deciphers the telephone number dialed by the wireline user and alerts the controllers at the cell sites to page the corresponding mobile unit. Similarly, when a mobile telephone user places a call, the MTSC accepts the dialing data from the cell site controller and dials the desired number for transmission to the PSTN.

As referenced above, typical cellular networks include multiple adjoining cells each of which contains at least one cell site controller which operates under the direction of the MTSC. The cell site controller manages each of the radio channels at the site, supervises calls, turns the radio transmitter and receivers on and off, injects data onto the control and user channels, and performs diagnostic tests on the cell site equipment. Each cell typically contains one radio transmitter and two radio receivers. In operation, both receivers are generally tuned to the same frequency. However, the receiver which locates the stronger radio signal is continuously selected.

In these prior art systems, each cell further has at least one radio channel that transmits control data to and receives control data from the mobile units. This control data advises the mobile unit that a call is coming from the MTSC or, conversely, advises the controller that a mobile telephone user desires to place a call. To complete the connection, the controller uses the control channel to advise the mobile unit which user channel has been assigned to the call.

While cellular networks have been found to be of great value to mobile users whose travels span many miles, they have also been found to be prohibitively expensive to implement for small scale applications wherein system subscribers only desire wireless telephone services in limited geographic areas, such as, for example, within office buildings or in campus environments.

The Personal Communications Network (PCN) is a relatively new concept in mobile communications developed specifically to serve the aforementioned applications. Like cellular telephony, the PCN relates telephone numbers to persons rather than fixed locations. Unlike cellular telephones, however, the PCN telephones are directed to small geographic areas thus defining "microcellular" areas designed to operate in similar fashion to large scale cellular telephone networks. PCN technology is also similar to residential cordless telephones in that it utilizes base stations and wireless handsets. Unlike the latter, however, PCN technology utilizes advanced digital communications features which may be implemented either as private networks or regulated services. When offered by communications carriers as services, the PCN capability is generally referred to as Personal Communications Services (PCS).

Microcellular PCS are expected to provide wireless access for an increasingly important segment of the communications market. Such PCS therefore must meet the needs of the consumer market where expectations for good speech reproduction, immediate availability, low congestion, seamless handover of all calls and universal access are demanded.

There are presently in existence non-cellular, wireless PCN systems which require the design and implementation of complete overlaying networks to achieve the above-mentioned desired telephone services. See, for example, U.S. Pat. No. 4,980,907 issued to Raith et al and assigned to Telefonaktiebolaget L M Ericsson. This approach of providing a substantially new overlay of network components is, of course, highly expensive to implement and undesirable from a Local Exchange Carrier (LEC) perspective.

Consequently, a need has developed to provide a system and method for providing microcellular PCS which utilizes existing wireline switches. Still further, a need has developed to provide such a Distributed Radio Port Controller (DRPC) architecture which will permit both voice and internet data services to be provided to mobile subscribers. Yet still further, a need has developed to provide a DRPC architecture which supports such a PCS system (voice and internet data) with minimal impact on the existing base of embedded switches.

DISCLOSURE OF THE INVENTION

It is a principal object of the present invention to provide a method and system for providing microcellular Personal Communications Services (PCS) with handover functionality to subscribers with mobile terminals.

Still further, it is an object of the present invention to provide a method and system as disclosed above which are further adapted for use in cooperation with an Internet Packet Data Network (IPDN) and existing wireline switches, i.e., Local Exchange Carriers (LECs) in an Advanced Intelligent Network (AIN) so as to minimize the need for additional network components.

It is a further object of the present invention to provide a method and system as disclosed above adapted to provide voice and internet data services through the use of an improved Distributed Radio Port Controller (DRPC) architecture which achieves the desired handover with minimal impact on the existing base of embedded switches by generating new calls from target Radio Port Controllers (RPCs) through the switches to anchor RPCs and internally bridging carrier channels without the knowledge of the switches.

In carrying out the above objects and other objects, features and advantages of the present invention, the system provided for by Applicants includes at least one mobile terminal (handset) having the functionality of a Mobile Host *(MH). The system further includes a Home Location Register (HLR) for storing and providing subscription data and keeping track of where the mobile terminals are registered in order to deliver calls thereto.

The system further includes a plurality of Radio Port Controllers (RPCs) each having a corresponding serving area. Each of these RPCs is equipped with the functionality of a Foreign Agent (FA) and is provided in electrical communication with at least one Radio Port (RP) on a selected carrier channel for transmitting and receiving calls from the mobile terminals which are registered in the RPC serving area.

In keeping with the invention, an internet access node is also provided in electrical communication with the wireline switch. The internet access node, in turn, is provided in electrical communication with a Home Agent (HA) via the IPDN. A Correspondent Host (CH) is likewise provided in electrical communication with the internet access node via the IPDN.

Finally, the system includes a Visitor Location Register/ Directory Number Manager (VLR/DN-Mgr). The VLR/DN-Mgr is provided in electrical communication with the wireline switch, the HLR and the plurality of RPCs for storing information regarding the RPCs that are currently serving or anchoring PCS calls. Handover is provided by the present invention when the mobile terminals enter adjacent Radio Port (RP) coverage/RPC serving areas and communicate with target RPs/RPCs. As disclosed herein, in the latter case, i.e., inter-RPC handover, following such communication, new calls are generated from the new or "target" RPCs through the existing wireline switch to the anchor RPCs. At that point, the carrier channels are internally bridged within the RPC so as to provide seamless call handover.

In a preferred embodiment, a database is provided for storing a list of Universal Personal Telephone (UPT) numbers which have been assigned to the mobile subscribers. The database is operable to map these UPT numbers to the locations of their corresponding HLR. In the preferred embodiment, the system further includes a Service Control Point (SCP) which is provided in electrical communication with the aforementioned switch, HLR and the database in which is operable to query the HLR for routing information and provide the received response to the switch. The wireline switch is preferably, but not necessarily, an Integrated Services Digital Network (ISDN) switch and is provided in electrical communication with the plurality of RPCs and the internet access node via ISDN signaling. The wireline switch is also preferably, but again not necessarily, a Signaling System No. 7 (SS7) Service Switching Point (SSP) which is operable to communicate with the SCP via AIN 0.1 messages. The database and the HLR may reside on the same SCP which is similarly equipped with AIN release 0.1 functionality or may be provided as separate network components.

In further carrying out the above objects, features and advantages of the present invention, there is provided a method for providing internet data and voice services with handover functionality which, like the above disclosed system, is adapted for use in cooperation with the existing base of embedded wireline switches in the AIN. The method is used in cooperation with the IPDN and thus requires the initial provision of at least one mobile terminal having the functionality of a Mobile Host (MH). Subscription data for the subscribers is stored in at least one Home Location Register (HLR). A list of Universal Personal Telephone Numbers which have been assigned to the subscribers is similarly stored in a database. The disclosed method requires the mapping of UPT numbers to the locations of the corresponding HLR.

By monitoring the switch, predetermined triggers may be detected whereupon a corresponding query may be generated to request appropriate call routing instructions. In the preferred embodiment, a Service Control Point (SCP) is provided for receiving the generated query.

In keeping with the invention, the method further includes the provision of a plurality of Radio Port Controllers (RPCs), each having a corresponding serving area and which, are provided in electrical communication with the switch. Each of these RPCs is equipped with the functionality of a Foreign Agent (FA) and is provided in electrical communication with at least one Radio Port (RP) on a selected carrier channel for transmitting and receiving calls from mobile terminals registered within the RPC serving area.

By receiving and storing information from the mobile terminals in a Visitor Location Register/Directory Number Manager (VLR/DN-Mgr) regarding the RPCs that are currently anchoring calls, queries may be generated (preferably at the SCP) for receipt by the VLR/DN-Mgr requesting such anchor information on selected mobile terminals. Thereafter, calls may be routed to the selected mobile terminal through the determined anchor RPC. When the mobile terminal enters adjacent RPC serving areas, an electrical signal is generated at the mobile terminal for receipt by a target RPC. Following receipt of this electrical signal, a new call is generated which is directed to the anchor RPC through the switch. Finally, the carrier channels are internally bridged within the anchor RPC so as to provide handover functionality without the knowledge of the switch as contemplated by the present invention.

The above objects and other objects, features, and advantages of the present invention are readily apparent from the following detailed description of the best modes for carrying out the invention when taken in connection with the accompanying drawings wherein like reference numerals correspond to like components.

BRIEF DESCRIPTION OF THE DRAWINGS

FIG. 3 is a schematic diagram of the registration procedures utilized by a typical DRPC network architecture;

FIG. 4 is a schematic diagram illustrating the delivery of a call from the Public Switched Telephone Network to an idle registered handset (mobile terminal) in accordance with the DRPC architecture of FIG. 2;

FIG. 5 is a schematic diagram of the call origination procedures followed by the DRPC architecture of FIG. 3;

BEST MODES FOR CARRYING OUT THE INVENTION

Figure 1:
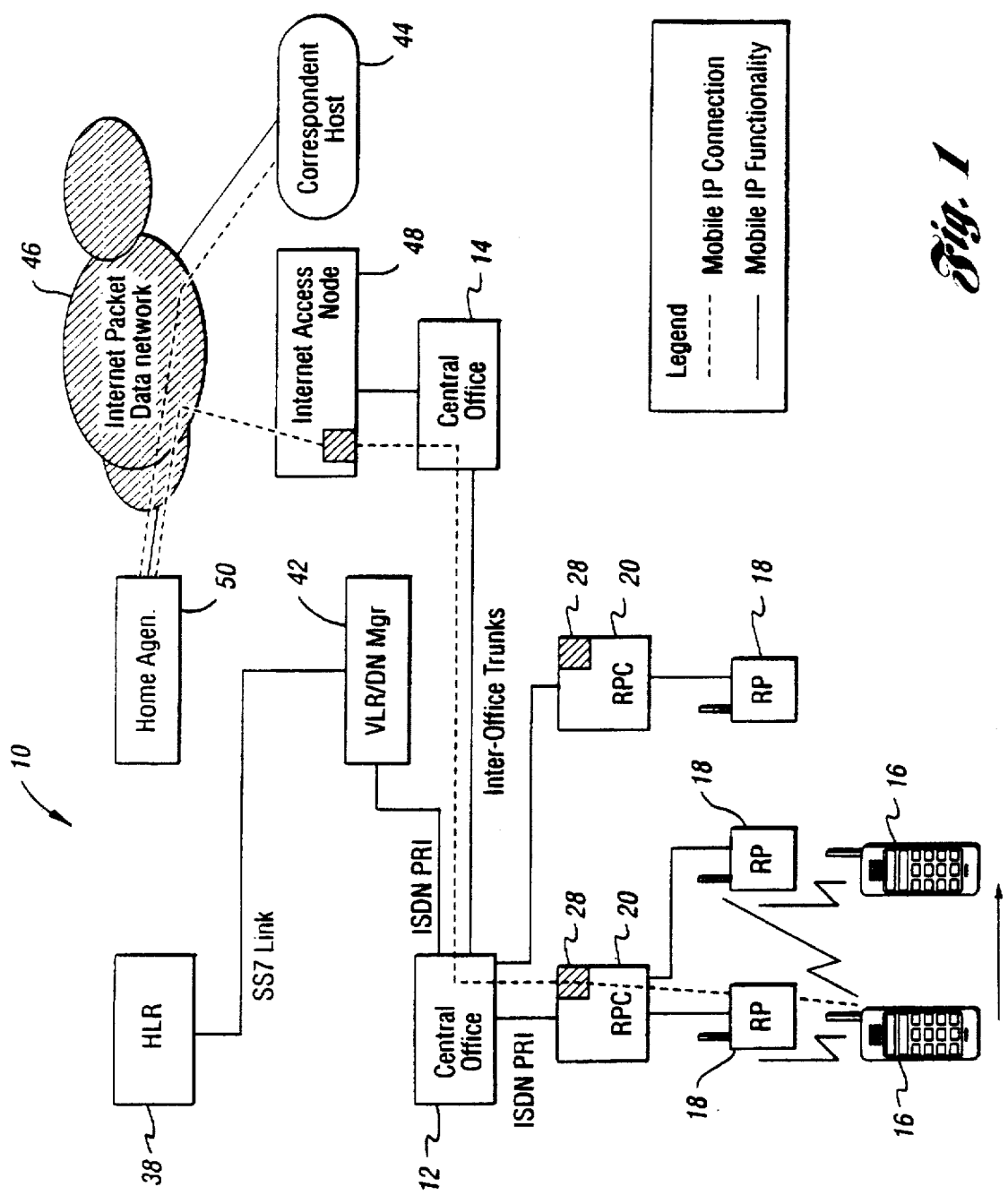
FIG. 1 is a schematic diagram of the network architecture of the present invention for providing voice and internet data services to subscribers at mobile terminals.

A schematic diagram of the network architecture of the present invention is shown in FIG. 1 and designated generally by reference numeral 10. Network architecture 10 is specifically adapted for use in cooperation with the existing base of embedded wireline switches found in a typical Local Exchange Carrier (LEC) of an Advanced Intelligent Network (AIN). As disclosed in further detail herein, these switches (identified in the schematic as 12 and 14) are adapted to provide microcellular Personal Communications Services (PCS) (voice and data) to subscribers at mobile terminals (handsets) 16.

To achieve the desired handover functionality contemplated by the present invention, there is provided a Distributed Radio Port Controller (DRPC) architecture which includes a plurality of Radio Ports 18 (RP-1 RP-2 . . . RP-n), each provided in electrical communication with a corresponding Radio Port Controller 20 (RPC-1, RPC-2 . . . RPC-n). Viewing FIG. 1 in conjunction with FIG. 2, each of the Radio Ports 18 has a corresponding coverage area 22. The RPCs 20 are further provided in electrical communication with their corresponding wireline switch and with one another to define a plurality of RPC serving areas 24 for transmitting and receiving calls from mobile terminals 16 registered therein. In keeping with the invention, each of the mobile terminals 16 are equipped with Mobile Host (MH) functionality. Each of the RPCs are further equipped with Foreign Agent (FA) functionality 28.

As recognized by those skilled in the art, a Distributed Radio Port Controller (DRPC) architecture is a modified hierarchical PCS network architecture in which the mobility functions (e.g. handover) and some vertical services are handled by the RPCs 20. Thus, in accordance with the present invention, the RPCs 20 are interconnected via voice and signaling circuits and use distributed processing techniques to handle PCS mobility functions. This minimizes upgrades to the existing switches. The DRPC architecture can use a variety of transport options and configurations.

Figure 2:
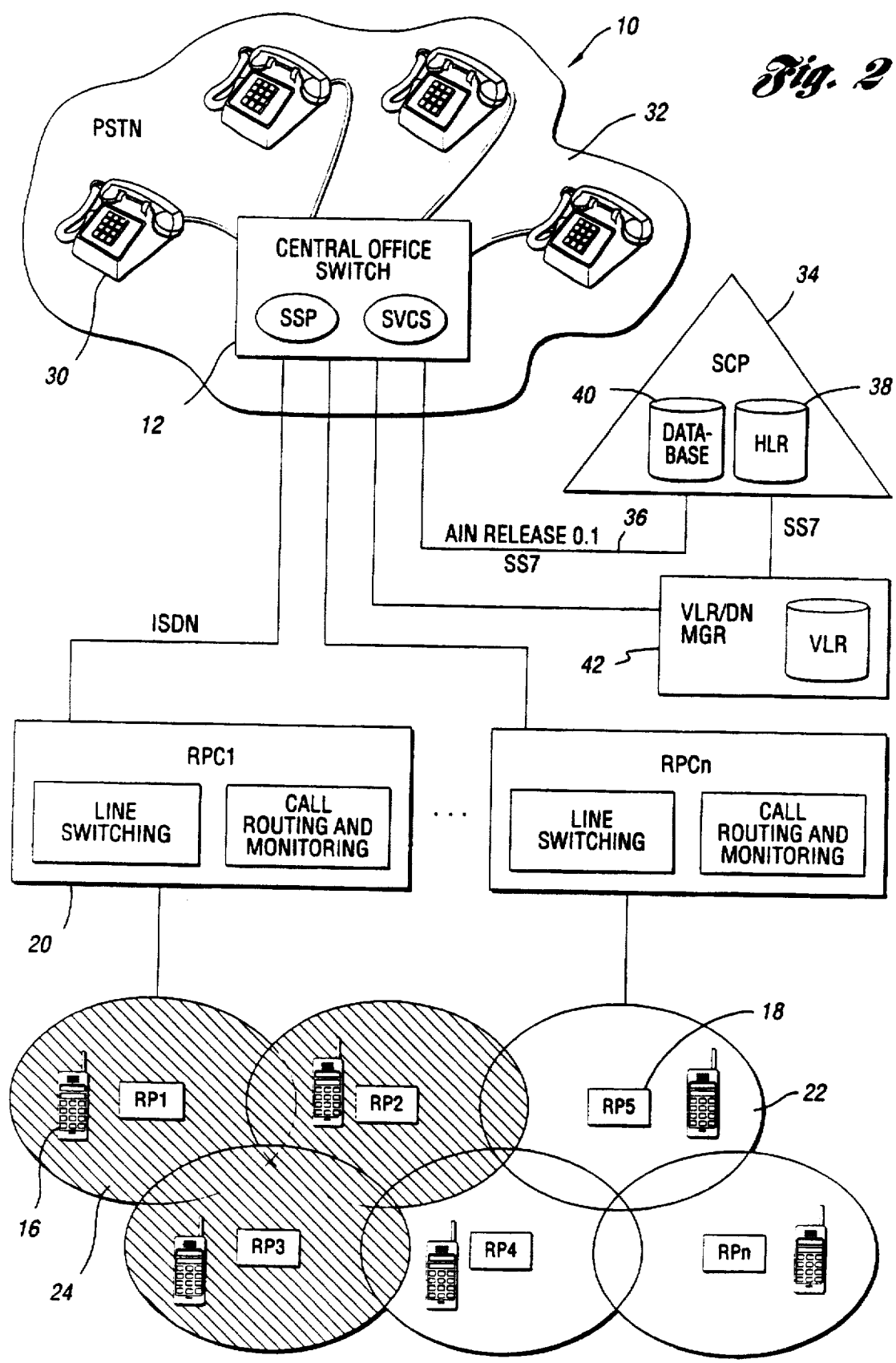
FIG. 2 is a detailed schematic diagram of a preferred embodiment of the DRPC portion of the network architecture of FIG. 1.

FIG. 2 illustrates the preferred embodiment of the DRPC portion of the network architecture of the present invention. As shown, switch 12 is provided in electrical communication with wireline Customer Premises Equipment (CPE) devices such as telephones 30 through a Public Switched Telephone Network (PSTN) 32. Switch 12 is an ISDN capable switch as well as a Signaling System No. 7 (SS7) Service Switching Point (SSP). Switch 12 is adapted to communicate with a Service Control Point (SCP) 34 with AIN 0.1 messages via SS7 network links 36. As shown by the SVCs (services) label in FIG. 2, switch 12 is also responsible for providing some of the services of the network, like call-waiting, to the subscriber. Other elements in the architecture may also support a subscriber's services. However, the short term goal contemplated by Applicants is to implement the services in the most economical fashion.

Referring again to FIGS. 1 and 2, each of the RPCs 20 control a number of RPs 18 and are responsible for handover functionality among RPs 18 under its control as well as between other RPCs. Each RPC 20 is connected over an ISDN interface to a single LEC switch 12 such as Central Office Switch (COS). This ISDN interface supports both voice and signaling capabilities. The RPCs 20 are not physically connected directly to one another. Rather, in the preferred embodiment, inter-RPC signaling is made possible by the existing ISDN interface provided by switch 12. Each of the RPCs 20 are, however, physically connected to a large number (potentially hundreds) of RPs 18 by some transport medium such as twisted-pair, coaxial cable, microwave link, etc. All aspects of radio technology must be handled by the RPCs 20 because the switches 12 and 14 are unaware of the radio portion of the call. As a result, the RPCs 20 have Radio Frequency (RF) related control functions and limited switching capabilities.

In operation, the RPC 20 which is serving or "anchoring" the call in process, hands over an active call to a new or "target" RPC as the mobile terminal 16 moves into an adjacent RPC serving area 24. In accordance with the invention, a signaling connection thus exists between any two RPCs involved in a handover. This inter-RPC signaling connection is used primarily to support mobility for an active call. To enable this connection, the RPCs 20 use the existing ISDN interface of their associated switch 12. The principles of this inter-RPC signaling are also applicable when RPCs 20 are connected to different switches.

The invention incorporates at least one Home Location Register (HLR) 38 for storing and providing subscription data and keeping track of where the mobile terminals 16 are registered in order to deliver calls thereto. In the preferred embodiment shown in FIG. 2, there is further provided a database 40 for storing a list of Universal Personal Telephone (UPT) numbers which have been assigned to the subscribers. The database 40 also functions to map the UPT numbers to the locations of their corresponding HLR 38. In this embodiment, SCP 34 is provided in electrical communication with switch 12, HLR 38 and database 40. In operation, the SCP 34 is operable to query the HLR 38 for routing information and provide the same to the switch 12.

A Visitor Location Register/Directory Number Manager (VLR/DN-Mgr) 42 is provided in electrical communication with switch 12, HLR 38 and the plurality of RPCs 20. The VLR/DN-Mgr 42 is operable to store information regarding the RPCs currently anchoring PCS calls. This information includes temporary routing number, current terminal location, service profile, and handover activity. As appreciated by those skilled in the art, VLR/DN-Mgr 42 has the traditional functionality of a cellular VLR[IS-41] component plus the added functionality of managing (assigning and unassigning) temporary routing Directory Numbers (DN) for PCS calls. The term "VLR/DN-Mgr" is used to signify the added functionality of DN management in the VLR. The VLR/DN-Mgr 42 is associated with a certain number of RPCs 20 based on its own message handling capacity. Significantly, the VLR/DN-Mgr is a fault-tolerant computing platform that may be upgraded rapidly to provide new PCS capabilities.

The VLR/DN-Mgr 42 has a signaling connection to each of its associated RPCs 20. Because signaling traffic is anticipated to be high during busy hour periods, ISDN B channels may also be used to connect RPCs 20 with the VLR/DN-Mgr 42. The VLR/DN-Mgr 42 is also connected to the SS7 network such that it may communicate with HLR 40 to update a user's location and receive a downloaded service profile.

Attention is directed to the fact that in the preferred embodiment of FIG. 2, HLR 38 and database 40 reside in the SCP 34. While HLR 38 and database 40 may, of course, reside on the same SCP as shown, they may also reside on different SCPs or be provided as stand alone components. In operation, the SCP 34 which is an AIN Release 0.1 SCP, is responsible for providing routing information for an originating switch 12, as referenced above.

Still referring to FIG. 1, the mobile Internet Protocol (IP) portion of the network architecture of the present invention may be further described. Mobile IP is a protocol designed by the Internet Engineering Task Force (IETF) to add mobility to Internet Protocols. There are four basic elements in any mobile IP architecture, namely: the Mobile Host (MH) which is a mobile wireless terminal; the Foreign Agent (FA) which provides the Mobile Host with a connection to the wireline network; the Home Agent (HA) which keeps track of the Mobile Host and forwards data packets to the Foreign Agent on behalf of the Mobile Host; and the Correspondent Host (CH), which may or may not be a Mobile Host. A Mobile Host may be a Correspondent Host to another Mobile Host.

In keeping with the invention, there is thus provided a Correspondent Host (CH) 44 which is assumed to be located somewhere in an Internet Packet Data Network (IPDN) 46. It is not important where the CH 44 is located so long as the voice distributed RPC architecture discussed above is enhanced to provide the functionality of the three key elements: MH, FA and HA. Specifically, the functionality of interest is Mobile Host registration, packet delivery from Internet to Mobile Host, packet delivery from Mobile Host to Internet, handover as the mobile unit 16 moves from RPC 20 to a new RPC and traffic measurement.

As indicated above, the mobile unit 16 (also called a handset or mobile terminal) is enhanced to provide Mobile Host (MH) functionality (not shown). This functionality does not affect the voice capability of the handset. The signaling protocols for the two capabilities are mutually exclusive. An existing handset may therefore be retrofitted to include the functionality of the MH, which is specified by Internet standards bodies.

RPCs 20 are also enhanced to provide Foreign Agent (FA) functionality 28. This functionality does not affect the voice capability of the RPCs 20. Again, the signaling protocols for the two capabilities are mutually exclusive. An existing RPC may therefore be retrofitted to include the FA functionality 28. This functionality, however, must support Mobile Host registration, packet delivery from and to Mobile Host, and accounting.

Still referring to FIG. 1, the mobile IP portion of the network architecture includes an Internet Access Node 48 which is provided in electrical communication with its wireline switch 14. A Home Agent (HA) 50 is also provided in electrical communication with the Internet Access Node 48 via the IPDN 46. Significantly, Home Agent 50 is not part of the wireless network. Its functionality is not embedded in the RPCs 20, the wireline switches 12, 14, etc., the HLR 38 or the VLR/DN-Mgr 42. Rather, it is a stand alone element that requires connection to the IPDN 46 so that it may communicate with the FA functionality 28 in the RPCs 20, as well as the rest of the world. Home Agent 50 need not be directly connected with the FA functionality 28 in the RPCs 20. As long as RPCs 20 are indirectly connected to the Internet Access Node 48, communication can take place.

Against this background, it is evident that neither the wireline switch 12 nor the VLR/DN-Mgr 42 are affected by the mobile IP implementation discussed above. Indeed, the HLR 38 is affected only to the extent that it needs to include additional parameters in the mobile terminals service profile to support Mobile Host registration. The largest impact is on RPC 20 (Foreign Agent functionality) and the handset 16 (Mobile Host functionality). Because the Home Agent 50 is not part of the wireless network, it does not impact voice services.

Referring now to FIG. 3 of the drawings, the registration process of a typical DRPC network is described. FIG. 3 shows the registration procedures when a user roams from one registration area to another. A registration area in this architecture is restricted to one RPC. The mobile terminal (handset) after recognizing a new preferred RPC signal, sends a registration request (REQ 52) to the new RPC. The new RPC sends the registration request (REQ 54) to the associated VLR. The new VLR, in turn, sends the registration request (REQ 56) to the user's HLR. The HLR validates the user, sends confirmation with the service profile back to the new VLR (REQ CFN 58) and notifies the old VLR and the old RPC to cancel the old registration (REQ CANCEL 60, REQ CANCEL 61). The new VLR stores the service profile in its memory and notifies the new RPC (REQ CFN 62), which then confirms the handset's registration request (REQ CFN 64). The RPC does not get the service profile from the VLR. Once registration is complete, the RPC has no knowledge of the handset.

FIG. 4 of the drawings shows the delivery of a call from the Public Switched Telephone Network to an idle registered handset. The originating switch uses the UPT number to locate the HLR associated with the called UPT number, and sends a route request message 66 to the HLR. The HLR forwards the request of the HLR (Route Request 68) that last registered the roaming user. The VLR/DN-Mgr allocates a temporary Directory Number (DN) for the user and sends it (DES DN 70) to the HLR, which forwards it (DEST DN 72) to the originating switch. The VLR/DN-Mgr informs the RPC about the incoming call (Alert Handset 74), and commands it to alert the handset. The RPC alerts the handset, (Alert 76) and when the handset responds to the RPC (Alert ACK 78), the RPC informs the VLR/DN-Mgr (Handset Alerted 80). The RPC now waits for the incoming call.

Once the originating switch gets the destination DN, it establishes a path 82 for the voice call to the terminating switch. The terminating switch gives a call indication to the RPC (ISDN set-up 84). The RPC then sends a call request 86 to the handset. The handset acknowledges the request, and alerts the user (alerting 88). When the user answers the call, the handset sends a call connect message 90 to the RPC, and operates on the specified voice channel. The RPC connects the air channel to the ISDN B channel and sends an ISDN connect message 92 to the terminating switch indicating the connection of the call. The RPC then informs the VLR/DN-Mgr about the status of the call 94.

Typical call origination procedures are shown in further detail in FIG. 5. In operation, the handset sends a call request 96 to the RPC. Because the switch does not have the service profile, it is the responsibility of the VLR/DN-Mgr to provide the RPC with call origination information based on the service profile along with a temporary DN that maps to a specific B-channel on the RPC-switch PRI interface. See DN request 98 and DN reply 100. The RPC then sends an ISDN call set-up message 102 to the LEC switch. The LEC switch completes the call in a normal fashion. Thus, the LEC switch alerts 104 the RPC which in turn alerts 106 the handset. Call connect messages 108 and 110 are also generated as shown. The VLR/DN-Mgr maintains an association between the call and the temporary DN so that future incoming calls to the user can be offered on the same DN or B-channel as long as the call is active.

Figure 6:
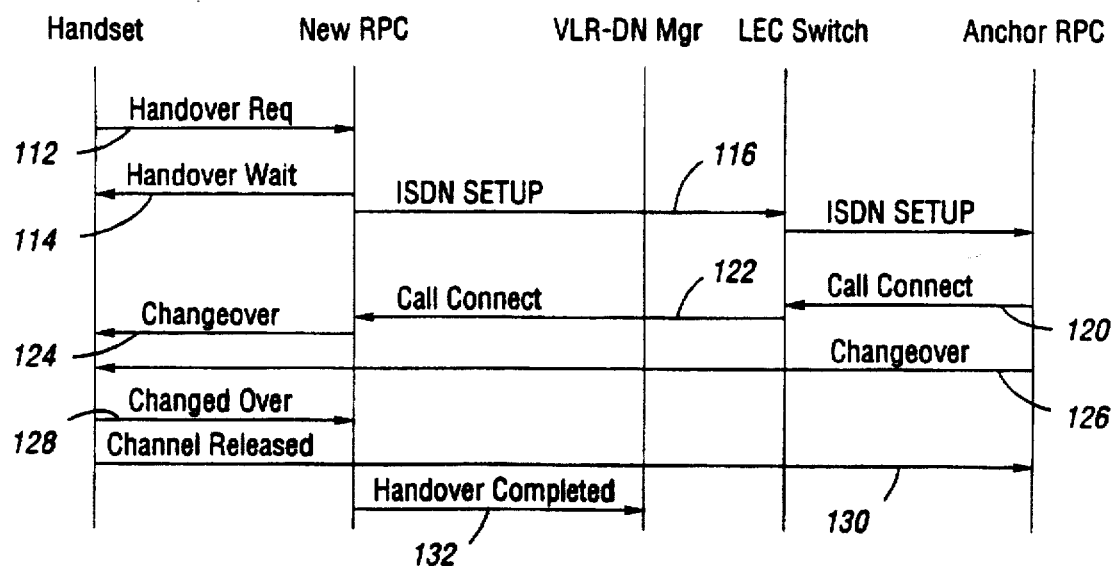
FIG. 6 is a schematic diagram of the data flow of typical mobile IP network architecture.

In FIG. 6 there is shown a schematic diagram of how handover is accomplished in a DRPC architecture when a handset moves from an initial (or anchor) RPC to another (or target) RPC. As shown, when the handset moves into the new RPC area, it determines that it is better served by the new RPC. It then initiates hand-over via the new RPC by requesting a handover 112 while providing the new RPC with a DN provided by the old RPC. The new RPC sends an acknowledgement 114 back to the handset indicating that the handover process has begun. The new RPC uses the DN provided by the handset to send an ISDN call set-up message 116 to the wireline switch for a connection 118 to the anchor RPC.

The anchor RPC receives the ISDN call indication, recognizes it as an inter-RPC handover based on the DN number, accepts the call and bridges the new B-channel to the old B-channel on which the handset is presently conversing (call connects 120 and 122). The new RPC obtains the ISDN call connect message from the wireline switch indicating that the path is cut through to the anchor RPC. The new RPC connects the air channel to the B-channel, and instructs the handset to change over 124. The anchor RPC also informs the handset to change over 126. The handset changes over to the new RPC 128, and releases the old air channel 130. Thereafter, the target RPC informs the VLR/DN-Mgr that a handover has been completed 132.

Figure 7:
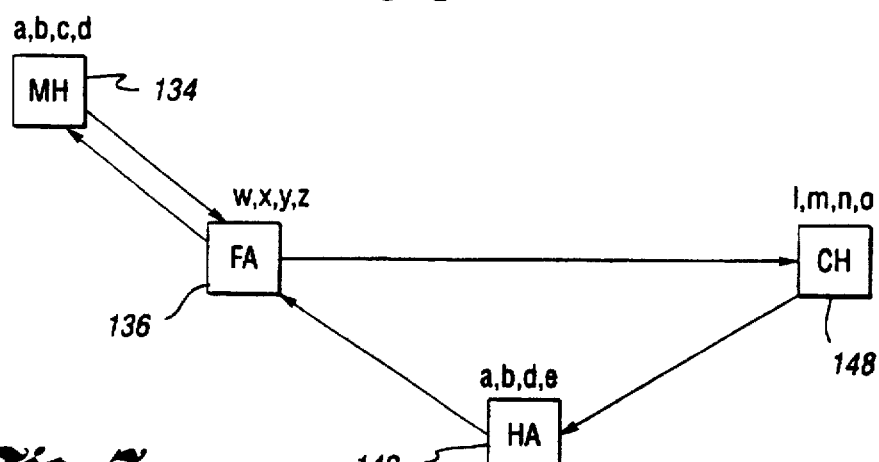
FIG. 7 is a schematic diagram of the mobile IP registration process followed by the mobile IP network architecture of FIG. 6.
Figure 8:
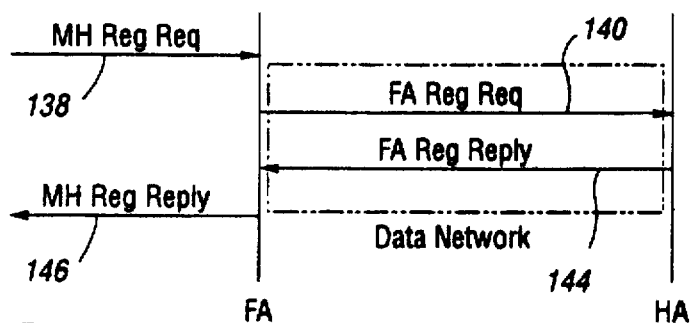
FIG. 8 is a schematic diagram of the packet delivery procedures followed by the mobile IP network architecture of FIG. 6.

FIG. 7 is a simplified diagram of typical mobile IP functionality. In operation, registration is initiated by a Mobile Host (MH) 134 that desires to change a Foreign Agent (FA) 136. The sequence of registration messages is shown more particularly in FIG. 8 in conjunction with FIG. 7. The Mobile Host 134 sends a MH registration request 138, which includes the FA's internet address, obtained through network layer beaconing to the FA 136. The FA 136 passes an FA registration request message 140 to an HA 142 which, in turn, will decide to accept or reject the registration. If the HA 142 decides to reject the registration for various reasons such as failed authentication, it informs the FA 136 with a registration reply 144 which, in turn, informs the MH 134. If the HA 142 decides to service the MH 134, the HA notes the FA's internet address associated with the MH 134 and sends the FA registration reply 144 message to the FA 136. The FA 136 notes the registration and informs the MH 134 with a MH registration reply 146. De-registration of the old FA 136 can occur either by explicit de-registration from the HA 142 or by timing out the old entry.

Figure 9:
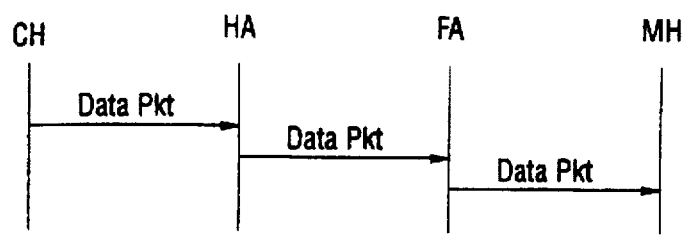
FIG. 9 is a schematic diagram of the packet encapsulation for packet forwarding of datagrams of the mobile IP network architecture of FIG. 6.
Figure 10:
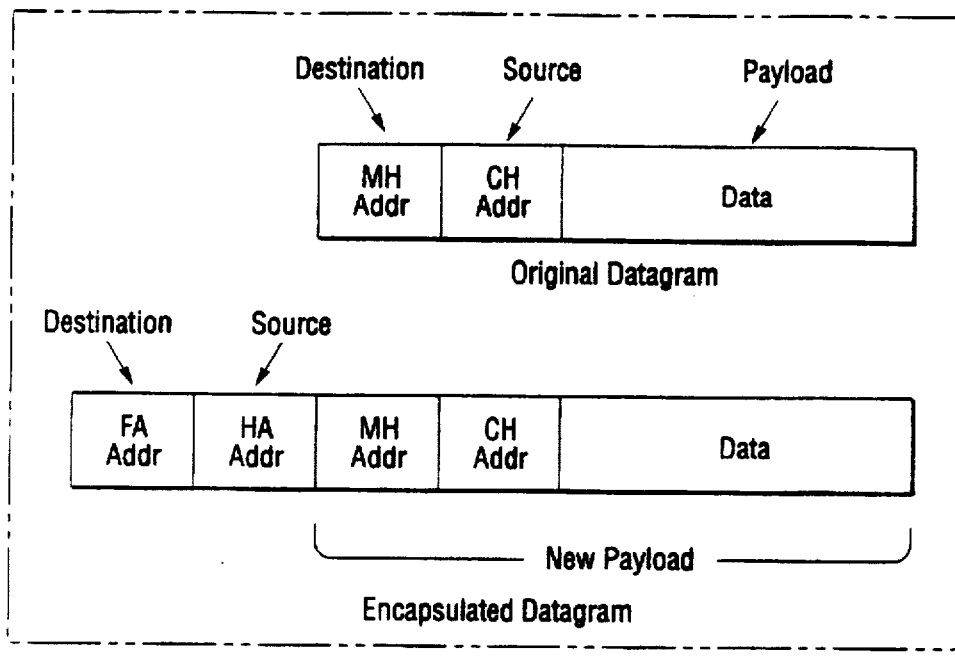
FIG. 10 is a schematic diagram of the packet origination procedures of the mobile IP network architecture of FIG. 6.

Packet delivery from a CH 148 to the MH 134 is shown in FIG. 9. Packets sent to the MH 134 are delivered to the MH's 134 home network based on its internet address, which is where the HA 142 resides. If the MH 134 is at home, the packet is delivered to it as if it were a stationary host on that network. If the MH 134 is away and the HA 142 has a FA destination (FA internet address) for the MH 134, the HA 142 intercepts the packet and forwards the packet to the FA 136 inside of another IP packet (encapsulation) as shown in FIG. 10. When the FA 136 receives the packet from the HA 142 it unwraps the original message (de-encapsulation) and forwards it to the MH 134 based on the MH's internet address.

When packets are sent from the MH 134 to the CH 148, the MH 134 sends the packet as a conventional IP packet to the FA 136. When the FA 136 receives the packet, it forwards it in the direction of the CH 148, based on the CH's 148 internet address just like a conventional internet data packet. The packet is then delivered to the CH 148 as if the packet were sent by a stationary host. If the CH 148 happens to be an MH, the packet would be delivered to the home subnet of the CH where its HA would then forward it to the CH via an FA.

Handover in the mobile IP environment is accomplished via an MH registering at a new FA as shown in FIG. 6. Once the MH's registration message reaches and is accepted at the HA 142, packets addressed to the MH 134 will be encapsulated and forwarded to the FA 136. Packets "in flight" to the old FA during registration are silently dropped and the old FA times out the old MH entry. Lost packets are retransmitted based on an end-to-end protocol such as TCP.

The architectures of the integrated DRPC and mobile IP portions of the system of the present invention although similar, have minor differences based on their respective applications and development history. The DRPC architecture portion is based on traditional full duplex circuit switched telephony, while the mobile IP portion architecture relies on dual simplex paths typically used in packet switched data networks. The DRPC portion relies on call set-up to connect handsets, while the internet protocol is based on best effort datagram service.

Data and voice customers are likely to exhibit different behavior. Voice customers will have longer duration calls with constant bit rate, while data customers will have shorter messages that can be delivered in bursts. Voice customers are likely to want their PCS handset to work similar to conventional telephones with common telephone features. As new features are added to the existing wireline service, PCS customers will want these new features in their handset, therefore evolution based on AIN is desirable. Data customers are likely to want their Mobile Hosts to operate similar to conventional computers and likely want evolution based on internet protocols and/or other computer products.

Both the DRPC portion and the mobile IP portion require a beaconing mechanism to identify cell boundaries; both require registration to provide handset location to the network; both require a minimum level of security; and both require some sort of accounting.

The system of the present invention integrates typical mobile IP architecture into DRPC architecture. The disclosed system thus uses beaconing based upon DRPC concepts. As those skilled in the art will recognize, in mobile IP the MH typically learns the FA's internet address from periodic beacons sent out by the FA. A mobile IP in the network infrastructure is not considered secured so the FA's address is provided in the authenticated message that the MH provides the FA. The FA then forwards the message to the HA. The HA, which shares a secret with the MH can then verify the authenticated message and know with confidence that the message originated from the MH. In the integrated system described herein, this information which the MH normally acquires during beaconing and shares with the HA is provided by the network when the handset/MH registers as described below. This means that all MHs will also need a UPT number.

The registration of handset and MHs in the system of FIG. 1 creates a dual registration problem because the devices have different identities (IP addresses and UPT numbers) on two networks. This results in the equivalent of two registration requests and two acknowledgements. Three approaches were identified for integrating registration requests: an integrated registration message; two separate registration request messages; and a single registration request with network aided registration of the second device. Applicants have made a preliminary choice based on the third approach which results in a smaller registration message and less variation in registration messages and handling than the other two approaches. It also leaves the DRPC registration messages intact.

Figure 11:
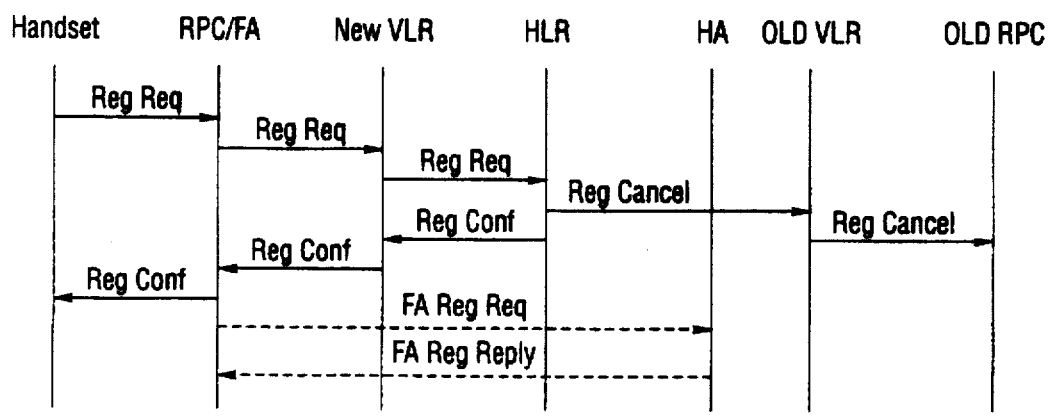
FIG. 11 is a schematic diagram of the integrated registration procedures of the network architecture of the present invention.
Figure 11:
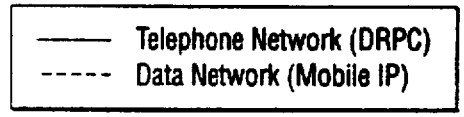

The message flows associated with registration are shown in FIG. 11. Handset/Mobile Host registration begins with a DRPC registration message sent to the RPC. Registration of the handset proceeds as in the conventional DRPC system as shown in conjunction with FIGS. 3 and 8. When the VLR receives the service profile from the HLR, if it indicates the Handset is a MH, it informs the RPC/FA, and provides information such that the FA can register with the HA. Upon receipt of the DRPC registration confirmation message, the RPC informs the handset that registration is complete with the same confirmation message used in the conventional DRPC environment.

The registration approach outlined above allows the air interfaces between the RPC and the handset to remain the same as before integration. The confirmation received by the handset guarantees that the voice handset has been registered and implies that an MH had been successfully registered, but does not guarantee it. Applicants considered providing confirmation after both registrations were received by their respective networks. It is Applicants understanding that failure to register at the HA should not preclude voice registration. Because the HA may be provided by a party other than the voice service provider, failure to register at the HA would allow a third party to deny voice services to the end user.

In further keeping with the invention, Applicants note that in DRPC architecture, the collection of accounting information occurs at the RPC where the call first passed. In the integrated system herein disclosed, however, this accounting does not work well for mobile IPs because data packets will not necessarily flow through a single RPC/FA. Because the notion of call setup does not exist in packet data, it thus requires different accounting. Therefore, Applicants have chosen to account at each RPC/FA as the data flows through the RPC/FA and not to try to link packets that flow through separate RPC/FAs to a single message.

With regard to security, it should be understood that the DRPC handsets herein described have the same level of security as in conventional DRPC environments. However, the security provided to MHs in the integrated environment is different than that in the typical mobile IP environment. Because the HA no longer receives a message authenticated by the MH, it must rely on a third party to provide authentication. In this case, it is the PSTN network that provides the authenticated portion of the FA to the HA registration messages. The message from the FA to the HA still has a signature, but the signature is provided by the RPC/FA based on information received from the HLR. Thus, the level of authentication of the MH is similar to that of the DRPC handset.

Applicants anticipate many enhancements to the described architecture. For example, one enhancement may involve extending multi-protocol support to the MHs. This extension would allow MHs to run other protocols such as Apple Talk and IPX without affecting the FA. However, it requires HA support which may be provided by the customer or the service provider. Enhancements to HAs can also be provided by independent developers to allow message filtering based on customer desires. Future systems may thus involve tighter integration of system components than the architecture disclosed herein.

The system of FIG. 1 allows DRPC compatible handsets to continue to operate in the DRPC system without knowledge of mobile IP. The DRPC handsets will thus continue to have access to new features developed under AIN while Mobile Hosts will be able to run new applications based on the internet protocol. Future systems may allow customers to run other network protocols between the MH and the MH's home network.

Significantly, the integrated DRPC/mobile IP architecture disclosed herein is well poised for an elegant transition to the evolving broadband network. Interconnecting RPCs 20 via a Metropolitan Area Network (MAN) (e.g. IEEE 802.6) or ATM network would require few modifications to the conceptual design. In addition, applicants contemplate that there may be benefits in off-loading some switching functions onto the inherent capabilities of a packet-based network. Thus, it may make sense to migrate call processing functions including vertical services away from the switch and into the RPCs in future versions.

Figure 12:
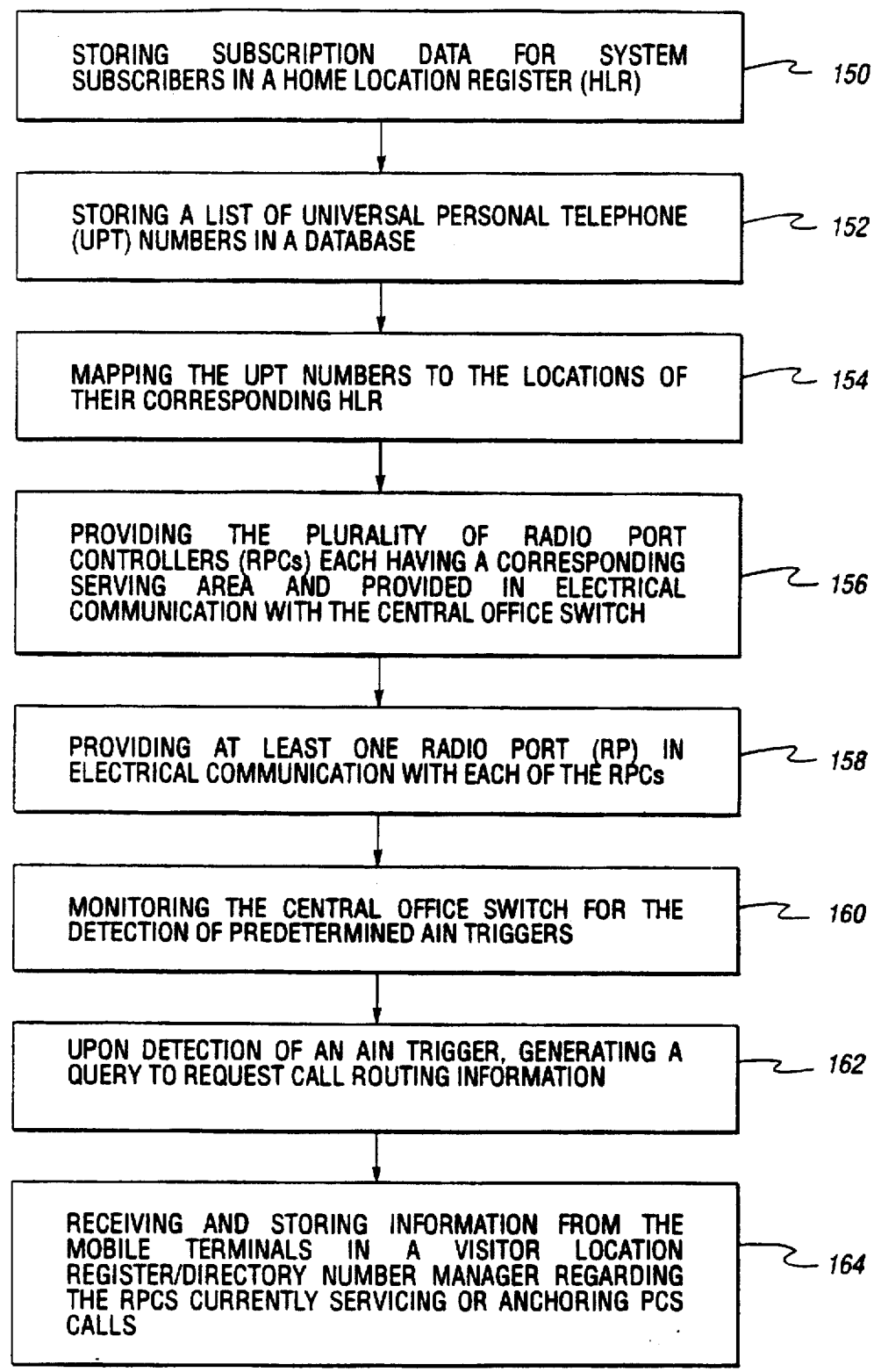
FIG. 12 is a flow diagram of the method steps of the present invention.

With reference now to FIGS. 1, 2 and 12 of the drawings, the operation of the method of the present invention and, in particular, the handover functionality will be described in further detail.

As shown, the method of the present invention includes the steps of storing subscription data for system subscribers in a Home Location Register (HLR) 38 as shown in block 150 as well as storing a list of Universal Personal Telephone (UPT) numbers which have been assigned to the mobile terminals in a database 40 as shown in block 152. The method further includes mapping these UPT numbers to the locations of their corresponding HLR 38 as shown in block 154.

Still further, the method includes the provision of a plurality of Radio Port Controllers (RPCs) 20 each having a corresponding serving area and provided in electrical communication with switch 12 as shown in block 156. Each of these RPCs 20 are further provided with at least one Radio Port (RP) 18 which is provided in electrical communication with an RPC 20 and a selected carrier channel for transmitting and receiving calls from mobile terminals 16 registered in the corresponding RPC serving areas 24 as shown in block 158.

In an effort to minimize, if not eliminate, modifications to the existing base of embedded switches, switch 12 is adapted to be monitored for the detection of predetermined AIN triggers as shown in block 160. Upon such detection of such triggers, a query is generated to request call routing information as shown at block 162.

In further keeping with the invention, information is received and stored from the mobile terminals in a VLR/DN-Mgr 42 regarding the RPCs currently servicing or "anchoring" PCS calls as shown in block 164. Significantly, the VLR/DN-Mgr 42 is a separate network element which supports the functionality to manage directory numbers (DNs) across multiple RPCs and LEC switches. The VLR/

DN-Mgr 42 provides gateway functionality, mapping X.25 messages from the RPCs to SS7/IS-41 messages to the HLR 32 (e.g. registration requests). This eliminates the need for individual RPCs 20 to have SS7 connectivity.

While the best modes for carrying out the invention has been described in detail, those familiar with the art to which this invention relates will recognize various alternative designs and embodiments for practicing the invention as defined by the following claims.

What is claimed is:

1. For use in cooperation with an Internet Packet Data Network (IPDN) and an Advanced Intelligent Network (AIN) having an existing wireline switch, a system for providing Internet data and voice services to mobile subscribers at mobile terminals without using a mobile telephone switch, the system comprising:

a Home Location Register (HLR) for storing and providing subscription information of said mobile terminals and keeping track of where said mobile terminals are registered in order to deliver Internet data and voice calls thereto;

a plurality of Radio Port Controllers (RPCs) each having a corresponding serving area and provided in electrical communication with said wireline switch via ISDN signalling, each of said RPCs further having at least one Radio Port (RP) provided in electrical communication with an RPC for transmitting and receiving Internet data and voice calls to and from mobile terminals registered in said RPC serving area and means for performing handover between a target RPC and an RPC currently serving a mobile terminal by bridging a call made from the target RPC to the RPC currently serving the mobile terminal internally, wherein said wireline switch has no knowledge of said handover;

an Internet Access Node in electrical communication with said wireline switch;

a Home Agent in electrical communication with said Internet Access Node via said IPDN and operable with the RPCs for transmitting and receiving Internet data to and from said mobile terminals; and a Visitor Location Register/Directory Number Manager (VLD/DN-Mgr) in electrical communication with said wireline switch, said HLR, and said plurality of RPCs for managing call information about said mobile terminals registered in said RPC serving areas by assigning and deleting temporary routing Directory Numbers (DNs) for said calls.

2. The system of claim 1 further comprising:

a database for storing a list of Universal Personal Telephone (UPT) numbers which have been assigned to said subscribers and mapping said UPT numbers to the locations of their corresponding HLR; and a Service Control Point (SCP) in electrical communication with said wireline switch, said HLR and said database, said SCP operable to query said HLR for routing information and provide said information to said switch.

3. The system of claim 1 wherein said wireline switch is an Integrated Services Digital Network (ISDN) switch.

4. The system of claim 1 wherein said plurality of RPCs are provided in electrical communication with said wireline switch via ISDN signaling.

5. The system of claim 1 wherein said Internet Access Node is provided in electrical communication with said wireline switch via ISDN signaling.

6. The system of claim 2 wherein said wireline switch is a Signaling System No. 7 (SS7) Service Switching Point (SSP) operable to communicate with said SCP with AIN 0.1 messages via SS7.

7. The system of claim 2 wherein said database and said HLR reside on the same SCP.

8. The system of claim 2 wherein said SCP is equipped with AIN release 0.1 functionality.

9. The system of claim 1 wherein said RPCs are connected to said wireline switch via ISDN lines.

10. The system of claim 1 wherein said VLR/DN-Mgr is provided in electrical communication with said HLR via a SS7 signaling connection.

* * * * *